(12) United States Patent
Jeol et al.

(10) Patent No.: US 9,283,694 B2
(45) Date of Patent: Mar. 15, 2016

(54) COMPOSITE POLYESTER ARTICLE

(75) Inventors: Stéphane Jeol, Lyons (FR); Gilles Orange, Vourles (FR); Franck Touraud, Eyzin Pinet (FR)

(73) Assignee: RHODIA OPERATIONS, Paris (FR)

( * ) Notice: Subject to any disclaimer, the term of this patent is extended or adjusted under 35 U.S.C. 154(b) by 753 days.

(21) Appl. No.: 13/514,928

(22) PCT Filed: Dec. 10, 2010

(86) PCT No.: PCT/EP2010/069340
§ 371 (c)(1),
(2), (4) Date: Aug. 28, 2012

(87) PCT Pub. No.: WO2011/070135
PCT Pub. Date: Jun. 16, 2011

(65) Prior Publication Data
US 2013/0001822 A1    Jan. 3, 2013

(30) Foreign Application Priority Data

Dec. 11, 2009    (FR) .................................... 09 58872

(51) Int. Cl.
| | |
|---|---|
| *B29C 70/46* | (2006.01) |
| *B29B 17/04* | (2006.01) |
| *B29C 43/00* | (2006.01) |
| *B29C 70/48* | (2006.01) |
| *C08J 5/04* | (2006.01) |
| B29C 45/14 | (2006.01) |
| B29K 67/00 | (2006.01) |
| B29K 105/08 | (2006.01) |

(52) U.S. Cl.
CPC .............. *B29B 17/04* (2013.01); *B29C 43/003* (2013.01); *B29C 70/465* (2013.01); *B29C 70/48* (2013.01); *C08J 5/04* (2013.01); B29C 45/14786 (2013.01); B29K 2067/00 (2013.01); B29K 2105/0809 (2013.01); C08J 2367/02 (2013.01); Y02W 30/625 (2015.05)

(58) Field of Classification Search
CPC ...................................................... B29C 70/465
See application file for complete search history.

(56) References Cited

U.S. PATENT DOCUMENTS

| | | | |
|---|---|---|---|
| 5,019,450 A | 5/1991 | Cogswell et al. | |
| 2008/0292858 A1 | 11/2008 | Dajek | |
| 2009/0246468 A1 | 10/2009 | Schubiger | |
| 2010/0062238 A1* | 3/2010 | Doyle ..................... | B29C 70/02 428/295.1 |

FOREIGN PATENT DOCUMENTS

| | | |
|---|---|---|
| DE | 102005057181 A1 | 6/2007 |
| EP | 1892072 A1 | 2/2008 |
| EP | 1990369 A1 | 11/2008 |
| GB | 2313312 A | 11/1997 |

OTHER PUBLICATIONS

Leaversuch, Robert; "Thermoplastic Polyesters: It's a Good Time to Know Them Better"; Plastics Technology; Jun. 2004; accessed at http://www.ptonline.com/articles/thermoplastic-polyesters-it's-a-good-time-to-know-them-better on Aug. 14, 2015.*
International Search Report issued on Mar. 11, 2011 by the European Patent Office as the International Search Authority in corresponding International Patent Application No. PCT/EP2010/069340, and an English language translation of the Search Report.

* cited by examiner

*Primary Examiner* — Alison Hindenlang

(57)    ABSTRACT

A method for manufacturing a composite article is described that includes a step of impregnating a reinforcing fabric with a semi-aromatic polyester composition in the molten state, having a melt viscosity η of 20 Pa·s to 200 Pa·s. The reinforcing fabric can be maintained at a temperature of plus or minus 50° C. relative to the melting temperature of the polyester.

6 Claims, No Drawings

COMPOSITE POLYESTER ARTICLE

CROSS-REFERENCE TO PRIOR APPLICATIONS

This application is a National Stage of PCT/EP2010/069340, filed Dec. 10, 2010, and designating the United States (published in French on Jun. 16, 2011, as WO 2011/070135 A1; the title and abstract were published in English), which claims priority of FR 0958872, filed Dec. 11, 2009, each hereby expressly incorporated by reference in its entirety and each assigned to the assignee hereof.

The present invention relates to the use of polyesters of high fluidity for impregnating reinforcing materials in the form of industrial fabrics for making composites. The field of the invention is that of composites and methods of manufacture thereof.

In the area of high-performance materials, composites have gained a dominant position, because of their performance and the weight savings that they offer. The high-performance composites that are best known at present are obtained from thermosetting resins, use of which is limited to applications in short to medium runs, principally in aeronautics and motor sport, and in the best cases have manufacturing times close to about fifteen minutes, for example in the manufacture of skis. The cost of these materials, and/or the manufacturing times, make them incompatible with mass production. Moreover, the use of thermosetting resins often involves the presence of solvents and monomers. Finally, these composites are difficult to recycle.

With regard to manufacturing times, an answer is provided by composites with a thermoplastic matrix. The thermoplastic polymers are generally known for their high viscosity, which is an impediment with regard to the impregnation of reinforcing materials, which are generally made up of very dense multifilament bundles. Using the commercially available thermoplastic matrices, impregnation is difficult, requiring either prolonged impregnation times, or high application pressures. In most cases the composites obtained from these matrices may have microcavities and unimpregnated regions. These microcavities cause decreases in mechanical properties, premature aging of the material as well as delamination problems when material is composed of several reinforcing layers. This phenomenon of loss of mechanical properties is further accentuated when the cycle times for manufacturing composite articles decrease.

The aim of the present invention is therefore to overcome these drawbacks by proposing a composite article that can be manufactured with short cycle times while having good service properties, such as good mechanical properties.

The present invention relates to a method of manufacturing a composite article comprising:

a) a step of impregnation of a reinforcing fabric with a semi-aromatic polyester composition in the molten state, having a melt viscosity η between 20 and 200 Pa·s, said reinforcing fabric being maintained at a temperature±50° C. relative to the melting point of said polyester, said melt viscosity being measured by means of a plate-on-plate rheometer with diameter of 50 mm, with stepwise scanning of shearing in the range from 1 to 160 $s^{-1}$, by melting a film of said semi-aromatic polyester with a thickness of 150 μm at a temperature from 25 to 30° C. above its melting point; and b) a step of cooling and then recovery of the composite article.

The applicant discovered unexpectedly that the use of the semi-aromatic polyesters of high fluidity for manufacturing composite articles made it possible to obtain articles having good mechanical properties, such as notably rigidity, breaking strength, impact toughness, and fatigue behavior, even when they are manufactured with cycle times shorter than those usually employed, and without any other treatment. This makes it possible to supply a composite material offering an advantage of reduced costs of manufacture, by using equipment employing shortened cycle times.

The articles according to the invention notably offer the advantage that they are rigid, light-weight, and recyclable, and have a good surface appearance.

More precisely, the invention relates to a method of manufacturing a composite article comprising at least:

a) a step of impregnation of a reinforcing fabric with a semi-aromatic polyester composition in the molten state, having a melt viscosity η between 20 and 200 Pa·s, said reinforcing fabric being maintained at a temperature that is ±50° C. relative to the melting point of said polyester;

the impregnation of the fabric with the polyester composition being carried out either:

by injection of the polyester composition in the molten state on the fabric; or by putting the fabric in contact with the polyester composition in the form of powder or film, then melting said polyester composition; and b) a step of cooling and then recovery of the composite article.

"Fabric" means a textile surface obtained by assembling threads or fibers, consolidated by any method, such as notably gluing, felting, braiding, weaving, knitting. These fabrics are also called fibrous or filament networks. "Thread" means a monofilament, a continuous multifilament thread, a yarn of fibers, obtained from fibers of a single type or from several types of fibers intimately mixed together. The continuous thread can also be obtained by assembling several multifilament threads. "Fiber" means a filament or a collection of filaments that have been chopped, cracked or converted.

The reinforcing threads and/or fibers according to the invention are preferably selected from threads and/or fibers of carbon, of glass, of aramids, of polyimides, of flax, of hemp, of sisal, of coir, of jute, of kenaf and/or of a mixture thereof. More preferably, the reinforcing fabrics consist solely of reinforcing threads and/or fibers selected from threads and/or fibers of carbon, of glass, of aramids, of polyimides, of flax, of hemp, of sisal, of coir, of jute, of kenaf and/or of a mixture thereof.

These fabrics preferably have a substance, i.e. weight per square meter, between 100 and 1000 $g/m^2$.

Their structure can be random, unidirectional (1D), or multidirectional (2D, 2.5D, 3D etc.).

Preferably, the semi-aromatic polyesters have a melt viscosity η between 30 and 150 Pa·s.

The number-average molecular weight (Mn) of the semi-aromatic polyesters is preferably between 5000 g/mol and 20 000 g/mol, having adequate mechanical properties and a certain durability during the various forming operations.

Semicrystalline polyesters are particularly preferred.

The semi-aromatic polyesters are preferably selected from the group consisting of polyesters obtained by polycondensation of at least one aromatic diacid or a corresponding diester with an aliphatic, cycloaliphatic or aromatic diol. The aromatic diacids and their diesters can be selected for example from terephthalic acid, dimethyl terephthalate, isophthalic acid, dimethyl isophthalate, 5-tert-butyl isophthalic acid, 4,4'-biphenyl dicarboxylic acid and isomers of dimethyl naphthalate. The diols can be selected for example from ethylene glycol, diethylene glycol, propylene glycol, butylene glycol, isosorbide and 1,4-cyclohexane dimethanol.

According to a particularly advantageous embodiment, the semi-aromatic polyesters according to the invention are selected from the group consisting of polyethylene terephthalate (PET), polybutylene terephthalate (PBT), polytrimethylene terephthalate (PTT) and polyethylene naphthalate (PEN).

PET and PBT are semicrystalline polyesters ($MP_{PET}$=245-250° C., $MP_{PBT}$=225° C.). They are polycondensates that are sensitive to hydrolysis (a reaction that is the inverse of esterification) during processing. For example, a PET or PBT polyester must have a water content below 100 ppm at the time of application to avoid an excessive decrease in molecular weights, which means great care is required in the drying, storing and application of the polyesters.

In contrast to the polyamides, these polyesters take up very little water, of the order of 0.3-0.6% at saturation, which guarantees that they have good dimensional stability in a damp environment. Their density is close to 1.3-1.4. The semi-aromatic polyesters used in the context of the invention such as PET or PBT are more sensitive to hydrolysis than the polyamides. Thus, hydrolysis is observed starting from 100 ppm of water for PET and 200 ppm of water for PBT, whereas hydrolysis of a standard polyamide PA 66 takes place starting from 2000 ppm of water.

For producing low molecular weight polyesters, several different routes are possible. A first route consists of direct synthesis of polyesters in the molten state in a polycondensation reactor according to methods that are well known by a person skilled in the art of the "direct esterification" type from diacids and diols or "transesterification" from diesters and diols. For example, for PET, synthesis in the molten state in a reactor can be carried out starting from terephthalic acid and ethylene glycol (direct esterification) or from dimethyl terephthalate and ethylene glycol (transesterification). Examples of methods of synthesis are described in the journal *Techniques de l'ingénieur* 06/2004, J6488, 12 p. This route thus makes it possible to control the molecular weight by stopping the polycondensation step at a given time. A second route consists of hydrolysis, alcoholysis, acidolysis or aminolysis of standard polyesters. Finally, a third route, notably developed for PBT, consists of polymerization of cyclic monomers CBT (cyclic butylene terephthalate) for preparing PBT by ring opening.

The polyesters of the type PET, PBT, PTT are generally synthesized in the molten state in a polycondensation reactor based on so-called direct esterification processes (PTA route) of terephthalic acid with an excess of glycol or transesterification (DMT route) of dimethyl terephthalate with an excess of glycol.

As in any balanced reaction, the presence of an excessive amount of water during application by melting granulated polyester tends to hydrolyze the chains and thus reduce the molecular weight of the polyester and the resultant properties. Thus, to avoid massive hydrolysis of the polyester chains at the time of application, it is recommended to have a water content below 200 ppm (0.02%) for PBT and below 100 ppm (0.01%) for PET at the conventional application temperatures of these polyesters. This water content varies depending on the chemical nature of the polyester and the application temperature.

Polyesters of high fluidity can notably be obtained by controlling their molecular weight during synthesis, notably by controlling the polymerization time, by controlling the stoichiometry of the monomers or by adding, before or during polymerization, monomers that modify chain length, such as notably monohydric alcohol and/or monocarboxylic acid chain limiters. It is also possible to add multifunctional compounds during polymerization to provide branching.

Polyesters according to the invention can also be obtained by mixing, notably in the molten state, polyesters with chain-length-modifying monomers, such as notably diols, dicarboxylic acids, monohydric alcohol and/or monocarboxylic acids or alternatively with water, diamines or monoamines.

The composition of the invention can also comprise copolyesters derived notably from the aforementioned polyesters, or mixtures of these polyesters or (co)polyesters.

The step of impregnation of the semi-aromatic polyester of high fluidity and of the reinforcing fabric can be carried out in various ways, according to various possible methods. It is perfectly possible to carry out the impregnation of one or more reinforcing fabrics.

According to the method of the invention, the reinforcing fabric is maintained at a temperature that is ±50° C. relative to the melting point of said polyester. Thus, for example for a polyester having a melting point of 230° C., the reinforcing fabric is maintained at a temperature between 180 and 280° C. inclusive.

For example, the semi-aromatic polyester composition in the molten state can be injected into a molding chamber comprising at least one or more reinforcing fabrics. The interior of the molding chamber is at a temperature that is ±50° C. relative to the melting point of said semi-aromatic polyester. Then cooling of the molding chamber and of the article obtained can be carried out, finally recovering said article. This method is also known as the resin transfer molding (RTM) process by the thermosetting process, which consists of injecting resin into a closed mold in which reinforcing fibers were placed beforehand. This process can be carried out under pressure.

A composite article according to the invention can also be made by a "film stacking" process, which consists of hot compression of a stack of reinforcing fabrics and polyester films. Notably this involves bringing in contact one or more reinforcing fabrics and one or more films of semi-aromatic polyester of high fluidity and impregnating the fabrics by melting the semi-aromatic polyester. The pressures required for good assembly are generally above 30 bar.

The composite article according to the invention can also be produced by bringing in contact one or more reinforcing fabrics with powder of a semi-aromatic polyester as defined above, notably fine powder, and carrying out said impregnation by melting the aromatic polyester, at a temperature greater than or equal to the melting point of the semi-aromatic polyester, optionally under pressure.

After the reinforcing fabric has been impregnated with the semi-aromatic polyester, the article is obtained by solidification of the matrix. This cooling is carried out depending on the properties required for the material obtained.

Cooling can advantageously be carried out rapidly so as to avoid any pronounced crystallization of the semi-aromatic polyester, notably in order to maintain the properties of the article. Cooling can notably be effected in less than 5 minutes, more preferably in less than one minute. The mold can for example be cooled by a circulating cold fluid. Optionally, the composite article can also be transferred to a cold mold, optionally under pressure.

The semi-aromatic polyester composition and/or composite article according to the invention can also comprise any of the additives usually employed in compositions based on semi-aromatic polyester used for the manufacture of articles. Thus, as examples of additives we may mention thermal stabilizers, UV stabilizers, antioxidants, lubricants, pigments, dyes, plasticizers, reinforcing fillers, and agents that modify impact toughness.

Additives for improving the quality of the reinforcing fabrics/semi-aromatic polyester interfaces can also be used. These additives can for example be incorporated in the semi-aromatic polyester composition, incorporated in the threads and/or fibers of the reinforcing fabric, can be present on the threads and/or fibers of said fabric, or can be deposited on the reinforcing fabric. These additives can be coupling agents such as those of the aminosilane or chlorosilane type, or fluidizing or wetting agents, or a combination thereof.

Reinforcing fillers can be incorporated in the semi-aromatic polyester composition. These fillers can be selected from fibrous fillers, such as short glass fibers for example, or nonfibrous fillers such as kaolin, talc, silica, mica or wollastonite. Their size is generally between 1 and 50 μm. Submicron or even nanometric fillers can also be used, alone or supplementing the other fillers.

The present invention relates to an article that is obtainable by the method of the invention. The article can notably be a composite article based on semi-aromatic polyester comprising a reinforcing fabric, in which the semi-aromatic polyester has a melt viscosity η in the range from 20 to 200 Pa·s.

The articles according to the invention preferably comprise between 25 and 80 vol. % of reinforcing fabric relative to the total weight.

The articles of the invention can be finished or semi-finished articles, which can also be called prepregs. The composite articles can for example undergo thermoforming in the form of plates to give them a defined shape after cooling. The invention thus relates to composite articles or preforms that can be obtained by the method according to the present invention.

The articles of the invention can also be structures of the sandwich type having a core inserted between two skins. The composites of the invention can be used for forming the outer layers, combining them with a core of the honeycomb type or foam type. The layers can be assembled by chemical or thermal bonding.

The composite structures according to the invention can be used in many fields such as aeronautics, automobiles, electrical goods, the sports and leisure industry. These structures can be used for making sports articles such as skis or for making various surfaces such as special flooring, partitions, vehicle bodies, or billboards. In aeronautics, these structures are used notably for fairing panels (fuselage, wing, tail). In the automobile industry, they are used for example for floors or supports such as rear parcel shelves. These structures can also be used for making transparent composites intended notably for the furniture industry.

Special technical language is used in the description so as to facilitate comprehension of the principle of the invention. It must nevertheless be understood that no limitation of the scope of the invention is envisaged by the use of this special technical language. Modifications and improvements can notably be envisaged by a person skilled in the particular art based on his own general knowledge.

The term "and/or" includes the meanings and, or, as well as all the other possible combinations of the elements connected with this term.

Other details or advantages of the invention will become clearer from the following examples, which are given purely as a guide.

EXPERIMENTAL SECTION

Various PBT and PET polyesters were used in the examples.

Example 1

Preparation of the Polyesters

PET1 (comparative): polyethylene terephthalate standard grade for injection-molded bottles, of the order of 80 ml/g or a number-average molecular weight Mn of about 20 000 g/mol. (Tergal, grade T74F9).

PET2: polyethylene terephthalate of lower viscosity

PET3: polyethylene terephthalate of lower viscosity

PET4: polyethylene terephthalate of lower viscosity

PBT1 (comparative): standard polybutylene terephthalate with an MVR (melt volume flow rate) of 20 cm$^3$/10 min. (DSM, Arnite T06200 grade).

PBT2: polybutylene terephthalate of lower viscosity

PBT3: polybutylene terephthalate of lower viscosity

For the polymers serving as reference (PET1 and PBT1), the products were dried on reception at 130° C. for 36 h. They were then ground and dried in a ventilated stove at 60° C., then stored in air-tight bags until they were used.

The polymers of different viscosities were prepared by controlled hydrolysis. After measuring the water content of the products as received, a very small amount of distilled water was added in order to obtain the required water levels: 1000 ppm, 2000 ppm, and 3000 ppm. The products were then stored in sealed bottles, and heated to 50° C. for 12 h, then mixed for homogenization of the set. The water content is then measured by thermomanometry at 200° C. in order to verify that the level achieved is indeed that required (PET 2: 920 ppm, PET 3: 1990 ppm, PET 4: 2710 ppm; PBT 2: 1020 ppm, PBT 3: 1990 ppm, PBT 4: 2800 ppm).

For PBT 3000 ppm, the test was conducted by soaking in water for 4 days and drying with a cloth to remove excess liquid water on the surface (equilibrium at 2800 ppm in theory).

The products are then heated above their melting point by being passed through an extruder (single-screw Fourne 18×24D, without pack) at a flow rate of 0.5 kg/h and a residence time of about 3 minutes. The temperatures are 280° C. for PET, and 260° C. for PBT. The product leaving the extruder is cooled in a tank of water.

The products are then ground, dried at 130° C. under vacuum for 16 h and stored in air-tight bags until they are used.

These polyesters were characterized by measurements of viscosity in the molten state performed on an Ares Rheometrics cone/plate rheometer (diameter 25 mm, cone angle 0.1 rad), at 280° C. for the PET polyesters and at 255° C. for the PBT polyesters. The curves of viscosity as a function of shear rate show that the polymers in question have Newtonian behavior: the viscosity value adopted is the value at the plateau (between $10^{-1}$ and $10^2$ s$^{-1}$).

TABLE 1

| (PET Polyester) | |
| --- | --- |
| | Viscosity (Pa · s) |
| PET1 | 226 |
| PET2 | 33 |
| PET3 | 8 |
| PET4 | 3 |

TABLE 2

(PBT Polyester)

| | Viscosity (Pa · s) |
|---|---|
| PBT1 | 400 |
| PBT2 | 130 |
| PBT3 | 105 |
| PBT4 | 58 |

Example 2

Preparation of the Composites

The reinforcements used in the examples are in the form of glass cloth preforms, cut to the dimensions required for making the plates, i.e. 150×150 mm. The reinforcing fabric used is a glass fiber cloth (0°-90°) from Synteen & Luckenhaus produced from roving of 1200 tex, having a substance of 600 g/m$^2$.

The various polymers examined were prepared according to example 1: they are in the form of dry powder, of granulometry below 500 μm.

The composite articles are produced using a Schwabenthan hydraulic press (Polystat 300A) with twin temperature-controlled platens: heating platens (heating resistances), and cooled platens (circulation of water). A metal mold equipped with a cavity of dimensions 150 mm×150 mm is used.

To make a composite containing 80 wt. % of glass fibers (65 vol. %) with the cloth of 600 g/m$^2$ substance, a preform consisting of a stack comprising a total of 6 sheets of glass cloth is put in the mold. The whole amount of polymer is deposited in the form of powder: each sheet of cloth is thus dusted with a similar amount of polymer so that the total amount of polymer corresponds to the composition required for the composite.

The temperature of the platens of the press is raised beforehand either to 280° C. for the PETs or to 255° C. for the PBTs before inserting the preform. At this temperature, pressure is applied between a few bar (5 bar) up to 100 bar and maintained at this value. The whole is maintained at the same temperature and pressure, without degassing. If necessary, a series of degassings is carried out, followed by holding, always at the same temperature and pressure. The mold is then transferred to the cooled-platen device and held at a pressure of 100 bar. Different types of cycle were used: high and medium pressure, short and long duration.

The composite articles thus obtained have dimensions of 150×150 mm and a thickness of about 2 mm.

Example 3

Characterization of the PBT-Based Composites

Two types of cycles were carried out: cycle of 20 min at high pressure 100 bar (Cycle 1), cycle of 20 min at low pressure 35 bar (Cycle 2). These times correspond to the total duration of the cycle between heating the mold to temperature and cooling under pressure.

The 150×150 mm plates are cut in order to obtain samples with dimensions 150×20×2 mm. A conditioning treatment is then carried out with a cycle of 60 h at 70° C. under residual humidity RH of 62%, then stabilization at 23° C. RH50.

The mechanical properties were determined at 23° C. and humidity RH=50% (stabilization of the test specimens for 48 h at 23° C., RH=50%).

The 3-point bending tests at room temperature are carried out on parallelepipedal test specimens (150×20×2 mm), according to ISO standard No. 14125, on a ZWICK 1478 machine: center distance of axes 64 mm, traversing speed 5 mm/min. The values of Young's elastic modulus E (GPa) and of peak stress σmax (MPa) are measured and calculated.

TABLE 3

Results for articles made from PBT, HP cycle (1) and LP cycle (2)

| | CYCLE 1 (100 bar) | | CYCLE 2 (35 bar) | |
|---|---|---|---|---|
| Polymer used | Elastic modulus E (GPa) | Stress σmax (MPa) | Elastic modulus E (GPa) | Stress σmax (MPa) |
| PBT1 | 21.5 | 170 | 20 | 125 |
| PBT2 | — | — | 23 | 220 |
| PBT3 | — | — | 24 | 205 |
| PBT4 | — | — | 24.2 | 220 |

In the case of the LP manufacturing cycle (cycle 2), the mechanical performance obtained is reduced considerably for the reference PBT: max stress (peak) of 125 MPa, for a modulus value at 20 GPa.

With the PBTs of lower viscosity, the mechanical performance obtained according to the LP cycle (cycle 2) is greatly improved: stress about 220 MPa, and modulus about 24 GPa.

Example 4

Characterization of PET-based Composites

Two types of cycles were carried out: cycle of 20 min at high pressure 100 bar (Cycle 1), cycle of 20 min at low pressure 35 bar (Cycle 2). These times correspond to the total duration of the cycle between heating the mold to temperature and cooling under pressure.

The 150×150 mm plates are cut in order to obtain samples with dimensions 150×20×2 mm. A conditioning treatment is then carried out with a cycle of 60 h at 70° C. under a residual humidity RH of 62%, then stabilization 23° C. RH50.

The mechanical properties were determined at 23° C. and humidity RH=50% (stabilization of the test specimens 48 h at 23° C., RH=50).

The 3-point bending tests at room temperature are carried out on parallelepipedal test specimens (150×20×2 mm), according to ISO standard No. 14125, on a ZWICK 1478 machine: center distance of axes 64 mm, traversing speed 5 mm/min. The values of Young's elastic modulus E (GPa) and of peak stress σ max (MPa) are measured and calculated.

TABLE 4

Results for articles made from PET, HP cycle (1) and LP cycle (2)

| | CYCLE 1 (100 bar) | | CYCLE 2 (35 bar) | |
|---|---|---|---|---|
| Polymer used | Elastic modulus E (GPa) | Stress σmax (MPa) | Elastic modulus E (GPa) | Stress σmax (MPa) |
| PET1 | 29.6 | 500 | 30.1 | 495 |
| PET2 | — | — | 28 | 330 |
| PET3 | — | — | 26.5 | 250 |
| PET4 | — | — | 25.5 | 190 |

In the case of the LP manufacturing cycle (cycle 2), the mechanical performance obtained is substantially similar to that obtained with the HP cycle (cycle 1) for the reference PET: max stress (peak) of 495 MPa, for a modulus value at 30 GPa.

With the PETs of lower viscosity, the mechanical performance obtained according to the LP cycle (cycle 2) tends to degrade: the stress changes from 330 to 190 MPa, and the modulus decreases to 25 GPa.

The invention claimed is:

1. A method of manufacturing a composite article, the method comprising:
    a) impregnating a reinforcing fabric with a semi-aromatic polyester composition, wherein the semi-aromatic polyester is polybutylene terephthalate (PBT), in a molten state, having a melt viscosity η of from 58 Pa·s to 200 Pa·s, said reinforcing fabric being maintained at a temperature that is ±50° C. relative to the melting point of said polyester, said melt viscosity being measured using a plate-on-plate rheometer of diameter 50 mm, with stepwise scanning of shearing in the range from $1\ s^{-1}$ to $160\ s^{-1}$, by melting a film of said semi-aromatic polyester with a thickness of 150 μm at a temperature that is 25° C. to 30° C. above its melting point; and
    b) cooling and then recovering the composite article.

2. The method as defined by claim 1, wherein the reinforcing fabrics are fibrous or filament networks having threads and fibers made of a material selected from the group consisting of carbon, glass, an aramid, a polyimide, flax, hemp, sisal, coir, jute, kenaf and a mixture thereof.

3. The method as defined by claim 1, wherein the semi-aromatic polyester composition is injected in a molding chamber comprising at least one reinforcing fabric for carrying out the impregnation.

4. The method as defined by claim 1, wherein one or more reinforcing fabrics and one or more films of semi-aromatic polyester are brought into contact and said impregnation is carried out by melting the polyester.

5. The method as defined by claim 1, wherein one or more reinforcing fabrics and powder of a semi-aromatic polyester are brought into contact and said impregnation is carried out by melting the polyester.

6. The method as defined by claim 1, wherein the composite article comprises from 25 vol. % to 80 vol. % of reinforcing fabric relative to the total weight of the article.

* * * * *